Aug. 26, 1930.                    P. SOS                    1,774,338
SLIDING CAR
Filed Sept. 16, 1929
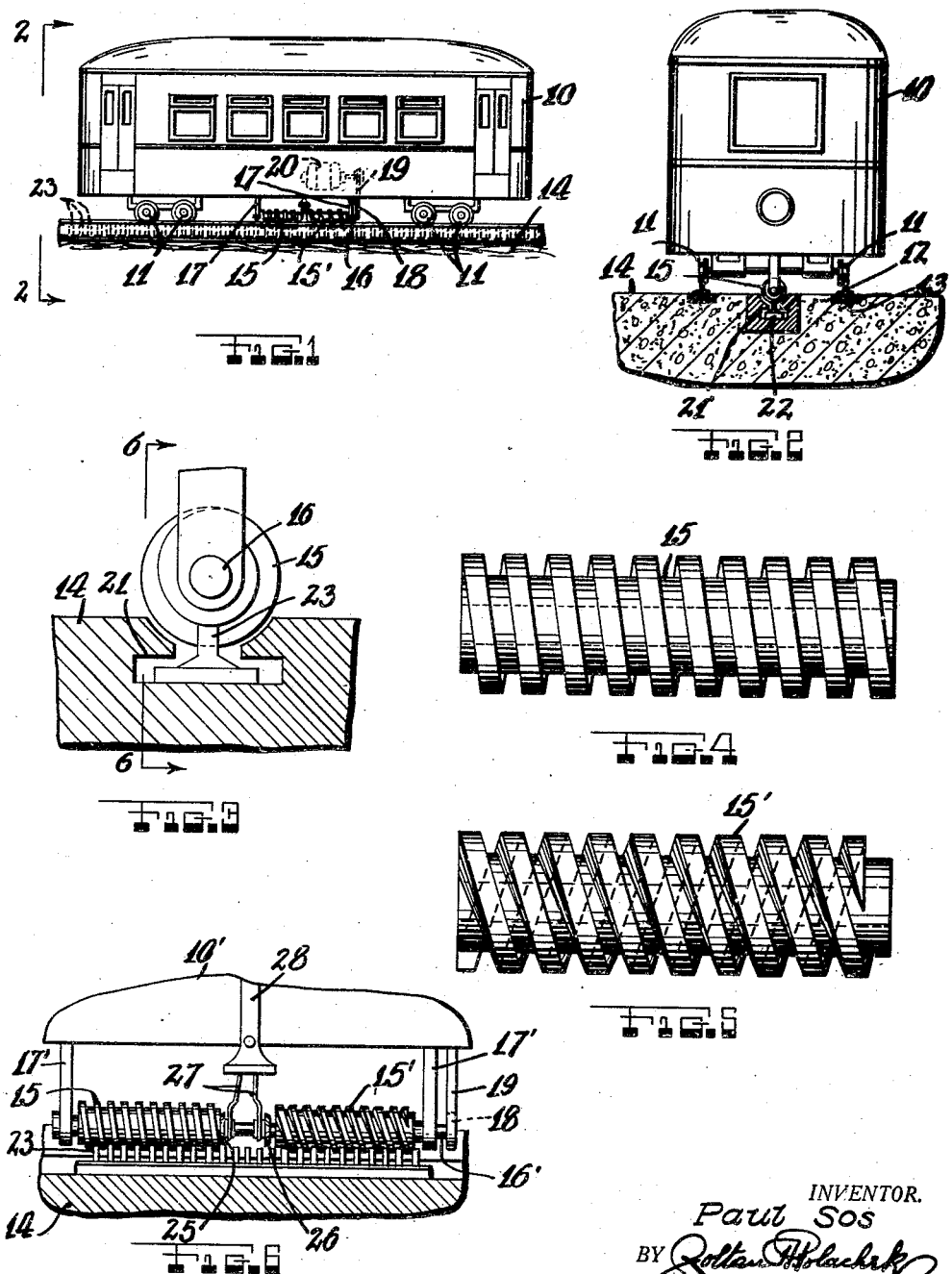
INVENTOR.
Paul Sos
BY
ATTORNEY Patented Aug. 26, 1930

1,774,338

UNITED STATES PATENT OFFICE

PAUL SOS, OF NEW YORK, N. Y.

SLIDING CAR

Application filed September 16, 1929. Serial No. 392,782.

This invention relates to new and useful improvements in sliding cars and has more particular reference to a novel drive therefor.

The invention has for an object the provision of a device of the class mentioned which is of simple, durable construction, dependable in use and efficient in action, and which can be manufactured and sold at a reasonable cost.

The invention proposes a drive for a car which includes a screw thread rotatively mounted on its bottom and longitudinally arranged with the direction of its travel, and engaging vertical stationary pegs from a rail having the pegs extending along its full length. A means should be provided for rotating the screw in one or the other direction for causing it to move along the pegs and drive the car. The screw may have a single thread or a double thread, and the drive may be modified by having screws of different pitch free upon a shaft, and a means for connecting one or the other of the screws on the shaft for driving the car at different speeds.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a side elevational view of a car provided with a drive according to this invention.

Fig. 2 is a vertical sectional view taken on the line 2—2 of Fig. 1 and showing the car in end elevation.

Fig. 3 is an enlarged detailed view of a portion of Fig. 2.

Fig. 4 is a fragmentary view of a portion of a single thread screw used in the device.

Fig. 5 is a similar view of a double screw.

Fig. 6 is a view taken on the line 6—6 of Fig. 3.

The reference numeral 10 indicates generally a car of any design or construction arranged to travel upon wheels 11. The wheels of the car are provided with flanges 12 engaging a track 13 secured upon the ground 14.

A longitudinal screw 15 is fixed upon a shaft 16 rotatively mounted in support members 17 depending from the bottom of the car 10. A wheel 18 is mounted on the shaft and connects with a chain 19 connected with the pinion of a motor 20 attached within the car.

The ground 14 is provided with a longitudinal opening 21 arranged parallel with the track 13. A rail 22 is mounted within the opening and is provided with a plurality of vertical spaced pegs 23. These pegs terminate slightly below the surface of the ground 14. The screw 15 is arranged to slightly extend into the ground so as to engage the tips of the pegs 23 as clearly shown in Fig. 3.

In Fig. 4, a detail of screw 15 has been shown. It should be noticed that this screw is of the single thread type. In Fig. 5 a screw 15' has been illustrated of the double thread type. Obviously, a car provided with the screw 15' will travel much faster than one provided with the screw 15 in the case that both screws are rotated at the same speeds.

In the modified form of the device illustrated in Fig. 6, a car 10' has been indicated provided with depending support members 17' rotatively supporting a shaft 16'. A single threaded screw 15 is freely mounted on a portion of the shaft 16', and a double threaded screw 15' is freely mounted on another portion of the shaft 16'. A clutch 25 is mounted upon the shaft 16' and is arranged for connecting the shaft with the screw 15. A second clutch 26 is mounted upon the shaft 16' and is arranged for connecting the shaft with the screw 15'. Arms 27 connect the clutches with a lever 28 pivotally mounted upon the car 10'. A means should be provided for holding the lever tilted one way or the other way so that either the clutch 25 connects with the screw 15 and the clutch 26 is disengaged from the screw 15', or the clutch 26 connects with the screw 15' and the clutch 25 is disengaged from the screw 15.

Both of the screws 15 and 15' slightly extend into the ground 14 and simultaneously engage against the pegs 23 from the rail 22. A wheel 18 is fixed upon the shaft 16' and connects with a chain 19 connected with some driving means such as a motor.

In operation of the device illustrated in Fig. 1, the motor 20 may be energized for rotating the screw 15. Rotation of the screw forces the car 10 forwards or rearwards depending upon which direction the screw rotates, since the screw engages against the stationary pegs 23. This will be clear when it is considered that if the screw were held stationary and rotated, the action would be to move the pegs 23 but since the pegs are stationary and the car 10 which carries the screw may move, the rotation of the screw causes the screw itself to move.

In operation of the device illustrated in Fig. 6, the speed at which the car travels may be changed by engaging one or the other of the clutches for fixing one or the other of the screws upon the shaft. Assuming that clutch 25 is engaged with the screw 15, then rotation from the shaft 16 is communicated with this screw which causes the car to travel at a certain speed, while the screw 15′ merely idles. When the other clutch is engaged and the first mentioned clutch disengaged, the screw 15′ will receive rotation from the shaft 16′ and move the car at a faster rate since the latter screw had double threads. Now the screw 15′ merely idles.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a car, a shaft rotatively supported on the bottom thereof, means for rotating the shaft, a single threaded and a double threaded screw freely mounted on the shaft, clutches for connecting one or the other of the screws with the shaft, and a stationary ground rail with vertical pegs, the pegs of a portion of the rail engaging in the threads of both of said screws.

2. In combination with a car, a shaft rotatively supported on the bottom thereof, means for rotating the shaft, a plurality of screws having multiples of a constant pitch freely mounted on the shaft, clutches for connecting one or the other of the screws with the shaft, and a stationary ground rail with vertical pegs, spaced at said constant pitch, the pegs of a portion of the rail engaging in the threads of both of said screws.

In testimony whereof I have affixed my signature.

PAUL SOS.